United States Patent
Zhang et al.

(10) Patent No.: US 11,336,973 B2
(45) Date of Patent: May 17, 2022

(54) OPTICAL LINE TERMINAL OLT DEVICE VIRTUALIZATION METHOD AND RELATED DEVICE

(71) Applicant: Huawei Technologies Co., Ltd., Shenzhen (CN)

(72) Inventors: Yanhua Zhang, Shenzhen (CN); Zengzhan Wei, Xi'an (CN); Daoming Wang, Dongguan (CN); Jianwen Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/552,084

(22) Filed: Aug. 27, 2019

(65) Prior Publication Data

US 2019/0387295 A1 Dec. 19, 2019

Related U.S. Application Data

(63) Continuation of application No. PCT/CN2017/075246, filed on Feb. 28, 2017.

(51) Int. Cl.
*H04Q 11/00* (2006.01)
*H04L 12/46* (2006.01)

(52) U.S. Cl.
CPC ..... *H04Q 11/0067* (2013.01); *H04L 12/4641* (2013.01); *H04Q 2011/0064* (2013.01); *H04Q 2011/0086* (2013.01)

(58) Field of Classification Search
CPC ....... H04Q 11/0067; H04Q 2011/0064; H04Q 2011/0086; H04L 12/4641; H04B 10/27
See application file for complete search history.

(56) References Cited

U.S. PATENT DOCUMENTS

| | | | |
|---|---|---|---|
| 10,091,566 B2 | 10/2018 | Peng et al. | |
| 2004/0120326 A1 | 6/2004 | Yoon et al. | |
| 2008/0226293 A1 | 9/2008 | Ogushi | |
| 2008/0298809 A1 | 12/2008 | Zheng | |
| 2012/0294611 A1* | 11/2012 | Adler | H04Q 11/0067 398/45 |
| 2014/0321845 A1* | 10/2014 | Jiang | H04B 10/272 398/5 |

(Continued)

FOREIGN PATENT DOCUMENTS

| | | |
|---|---|---|
| CN | 101316257 A | 12/2008 |
| CN | 103870749 A | 6/2014 |

(Continued)

OTHER PUBLICATIONS

IEEE Std 1588-2008, IEEE Standard for a Precision Clock Synchronization Protocol for Networked Measurement and Control Systems, IEEE Instrumentation and Measurement Society, Jul. 24, 2008, 289 pages.

*Primary Examiner* — Jackie Zuniga Abad
(74) *Attorney, Agent, or Firm* — Slater Matsil, LLP

(57) ABSTRACT

An optical line terminal (OLT) device virtualization method and a related device, the method including creating a plurality of virtual OLT systems on an OLT device, and determining system resources of each of the plurality of virtual OLT systems according to a preset rule. The system resources include a physical resource and a logical resource, and physical resources and logical resources of the plurality of virtual OLT systems are different from each other.

18 Claims, 8 Drawing Sheets

(56) References Cited

U.S. PATENT DOCUMENTS

2015/0188812 A1* 7/2015 Zheng .................. H04L 45/586
  398/45
2016/0112778 A1* 4/2016 Wang ................ H04Q 11/0067
  398/45
2019/0306598 A1* 10/2019 Wen .................. H04Q 11/0067

FOREIGN PATENT DOCUMENTS

| CN | 104243092 A | 12/2014 |
|----|-------------|---------|
| CN | 104365063 A | 2/2015 |
| CN | 104467951 A | 3/2015 |
| CN | 105681933 A | 6/2016 |
| EP | 2579524 A1 | 4/2013 |
| EP | 2966876 A1 | 1/2016 |
| EP | 3062461 A1 | 8/2016 |
| WO | 2016169260 A1 | 10/2016 |

* cited by examiner

US 11,336,973 B2

OPTICAL LINE TERMINAL OLT DEVICE VIRTUALIZATION METHOD AND RELATED DEVICE

CROSS-REFERENCE TO RELATED APPLICATIONS

This application is a continuation of International Patent Application No. PCT/CN2017/075246, filed on Feb. 28, 2017, the disclosure of which is hereby incorporated by reference in its entirety.

TECHNICAL FIELD

This application relates to the field of optical communications technologies, and in particular, to an optical line terminal (OLT) device virtualization method and a related device.

BACKGROUND

With rapid development of new services such as a high-definition video, virtual reality, and cloud computing, users have an increasing requirement for bandwidth. Driven by this requirement, a conventional copper cable access technology has become difficult to meet a requirement of high-bandwidth access, and because of advantages such as high bandwidth, a strong long-distance transmission capability, great confidentiality, and a strong anti-interference capability, a fiber-based access technology can meet a requirement for bandwidth during current and future service development, and has become a main technology for implementing an access network.

An optical line terminal (OLT) is a core component of a fiber-based optical access network, is equivalent to a switch or a router in a conventional communications network, and is also a platform providing a plurality of services. The optical line terminal is usually disposed at an office end, to provide a user-oriented optical interface of a passive optical network. Main functions implemented by the optical line terminal are as follows: aggregating signals that carry various services at the office end, and sending the signals to the access network in a specific signal format for transmission to a terminal user, and sending signals from the terminal user to various service networks based on a service type.

Currently, the OLT device usually needs to carry services of tens of thousands of users, and these users may include a common user, a bank user, an enterprise user, a government user, and the like. Different users have different requirements. For example, the bank user may have a relatively high requirement for security of data transmission, and the enterprise user may have a relatively high requirement for convenience of data transmission. However, one OLT device usually cannot meet different requirements of a plurality of services, or cannot flexibly meet a change of requirements of a plurality of services. This brings a great challenge to service processing, data forwarding, and management and control of the OLT device.

SUMMARY

Embodiments of this application provide an optical line terminal OLT device virtualization method and a related device, so as to resolve a prior-art technical problem that it is impossible to meet all transmission requirements of a plurality of services by using a hardware layout condition of an existing OLT device.

According to a first aspect, an embodiment of this application provides an optical line terminal OLT device virtualization method, and the method may include creating a plurality of virtual OLT systems on an optical line terminal OLT device, and determining system resources of each of the plurality of virtual OLT systems according to a preset rule, where the system resources include a physical resource and a logical resource, and physical resources and logical resources of the plurality of virtual OLT systems are different from each other.

With reference to the first aspect, in a first possible implementation, the preset rule includes service boards that are on the OLT device and that are allocated to the plurality of virtual OLT systems are different, ports that are on the OLT device and that are allocated to the plurality of virtual OLT systems are different, optical network units ONUs that are on the OLT device and that are allocated to the plurality of virtual OLT systems are different, or service flows corresponding to the plurality of virtual OLT systems are different.

With reference to the first aspect or the first possible implementation of the first aspect, in a second possible implementation, the plurality of virtual OLT systems include one management OLT system and at least one common OLT system, where the common OLT system is configured to run and process an OLT service, and the management OLT system is configured to regulate the common OLT system and run and process the OLT service, or is configured to regulate the common OLT system.

With reference to the second possible implementation of the first aspect, in a third possible implementation, the at least one common OLT system includes a first virtual OLT system and a second virtual OLT system, and the method further includes receiving a request that is sent by the first virtual OLT system and that is used to operate the second virtual OLT system, determining whether the first virtual OLT system has preset operation permission, and if the first virtual OLT system has the preset operation permission, performing, by using the management OLT system, a target operation of the first virtual OLT system for the second virtual OLT system.

With reference to any one of the first aspect or the foregoing possible implementations of the first aspect, in a fourth possible implementation, the virtual OLT system includes a plurality of virtual local area networks (VLANs), and the method further includes: creating a corresponding forwarding domain (FD) for each VLAN in the plurality of virtual OLT systems, where any two VLANs in the plurality of OLT virtual systems correspond to different FDs.

With reference to the fourth possible implementation of the first aspect, in a fifth possible implementation, the plurality of virtual OLT systems include a third virtual OLT system and a fourth virtual OLT system, and an intersection set between a VLAN identifier (ID) set corresponding to the third virtual OLT system and a VLAN ID set corresponding to the fourth virtual OLT system is not an empty set, and the VLAN ID set includes VLAN IDs of all VLANs in a corresponding OLT system.

With reference to the fifth possible implementation of the first aspect, in a sixth possible implementation, the method further includes creating a forwarding entry for the FD, where the forwarding entry includes a MAC address table and/or a routing table.

With reference to any one of the first aspect or the foregoing possible implementations of the first aspect, in a seventh possible implementation, the logical resource includes at least one of an application process, a virtual machine (VM), a thread, network management, an alarm, a log, a configuration file, a media access control (MAC) address, an internet protocol (IP) address, a service flow, a VLAN, and a VLAN layer-3 interface With reference to any one of the first aspect or the foregoing possible implementations of the first aspect, in an eighth possible implementation, the physical resource includes at least one of a shelf, a slot, a port, an optical network terminal (ONT), a central processing unit CPU, and a memory.

According to a second aspect, an embodiment of this application provides an optical line terminal OLT device, and the device may include a processing unit, configured to create a plurality of virtual OLT systems on the optical line terminal OLT device, where the processing unit is further configured to determine system resources of each of the plurality of virtual OLT systems according to a preset rule, where the system resources include a physical resource and a logical resource, and physical resources and logical resources of the plurality of virtual OLT systems are different from each other.

With reference to the second aspect, in a first possible implementation, the preset rule includes service boards that are on the OLT device and that are allocated to the plurality of virtual OLT systems are different, ports that are on the OLT device and that are allocated to the plurality of virtual OLT systems are different, optical network units (ONUs) that are on the OLT device and that are allocated to the plurality of virtual OLT systems are different, or service flows corresponding to the plurality of virtual OLT systems are different.

With reference to the second aspect or the first possible implementation of the second aspect, in a second possible implementation, the plurality of virtual OLT systems include one management OLT system and at least one common OLT system, where the common OLT system is configured to run and process an OLT service, and the management OLT system is configured to regulate the common OLT system and run and process the OLT service, or is configured to regulate the common OLT system.

With reference to the second possible implementation of the second aspect, in a third possible implementation, the device further includes a receiving unit, the at least one common OLT system includes a first virtual OLT system and a second virtual OLT system, and the processing unit is further configured to receive, by using the receiving unit, a request that is sent by the first virtual OLT system and that is used to operate the second virtual OLT system, determine whether the first virtual OLT system has preset operation permission, and if the first virtual OLT system has the preset operation permission, perform, by using the management OLT system, a target operation of the first virtual OLT system for the second virtual OLT system.

With reference to any one of the second aspect or the foregoing possible implementations of the second aspect, in a fourth possible implementation, the virtual OLT system includes a plurality of virtual local area networks (VLANs), and the processing unit is further configured to create a corresponding forwarding domain (FD) for each VLAN in the plurality of virtual OLT systems, where any two VLANs in the plurality of OLT virtual systems correspond to different FDs.

With reference to the fourth possible implementation of the second aspect, in a fifth possible implementation, the plurality of virtual OLT systems include a third virtual OLT system and a fourth virtual OLT system, and an intersection set between a VLAN ID set corresponding to the third virtual OLT system and a VLAN ID set corresponding to the fourth virtual OLT system is not an empty set, and the VLAN ID set includes VLAN IDs of all VLANs in a corresponding OLT system.

With reference to the fifth possible implementation of the second aspect, in a sixth possible implementation, the processing unit is further configured to create a forwarding entry for the FD, where the forwarding entry includes a MAC address table and/or a routing table.

With reference to any one of the second aspect or the foregoing possible implementations of the second aspect, in a seventh possible implementation, the logical resource includes at least one of an application process, a virtual machine (VI), a thread, network management, an alarm, a log, a configuration file, a media access control (MAC) address, an IP address, a service flow, a VLAN, and a VLAN layer-3 interface.

With reference to any one of the second aspect or the foregoing possible implementations of the second aspect, in an eighth possible implementation, the physical resource includes at least one of a shelf, a slot, a port, an optical network terminal ONT, a central processing unit CPU, and a memory.

According to a third aspect, this application provides an optical line terminal OLT device, and the OLT device has a function of implementing the method in the foregoing optical line terminal OLT device virtualization method embodiment. The function may be implemented by hardware, or may be implemented by hardware by executing corresponding software. The hardware or software includes one or more modules corresponding to the function.

According to a fourth aspect, this application provides an optical line terminal OLT device, where the OLT device includes a processor, and the processor is configured to support the OLT device in executing the corresponding function in the optical line terminal OLT device virtualization method in the first aspect. The OLT device may further include a memory, where the memory is configured to be coupled to the processor, and stores a program instruction and data that are required for the OLT device. The OLT device may further include a communications interface used for communication between the OLT device and another device or a communications network.

According to a fifth aspect, this application provides a computer storage medium, configured to store a computer software instruction that is used by the optical line terminal (OLT) device in the foregoing fourth aspect, where the computer software instruction includes a program designed to perform the foregoing aspects.

According to a sixth aspect, an embodiment of this application provides a computer program. The computer program includes an instruction. When a computer executes the computer program, the computer can perform a procedure in any one of the optical line terminal (OLT) device virtualization methods in the foregoing first aspect.

Beneficial effects of the embodiments of this application are as follows.

In the embodiments of this application, the plurality of virtual OLT systems are created on the optical line terminal (OLT) device, and the system resources of each of the plurality of virtual OLT systems are determined according to the preset rule, where the system resources include the physical resource and the logical resource, and the physical resources and the logical resources of the plurality of virtual OLT systems are different from each other. To be specific, in this application, based on a deployed network, a function in which an OLT physical device is virtualized as a plurality of OLT logic device is implemented without changing a network topology or a structure of a communications device. After a virtual function is used, a function provided by the virtual OLT device for the outside is the same as a previously provided function, application experience of a user and service provisioning remain unchanged. In addition, because physical resources and logical resources that are obtained by different virtual OLT systems through allocation are different, all virtual OLT systems are isolated from each other. Therefore, services of different customers or operators may be isolated and transmitted based on different requirements, so as to resolve a prior-art technical problem that it is impossible to meet all transmission requirements of a plurality of services by using a hardware layout condition of an existing OLT device.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Figure 1:
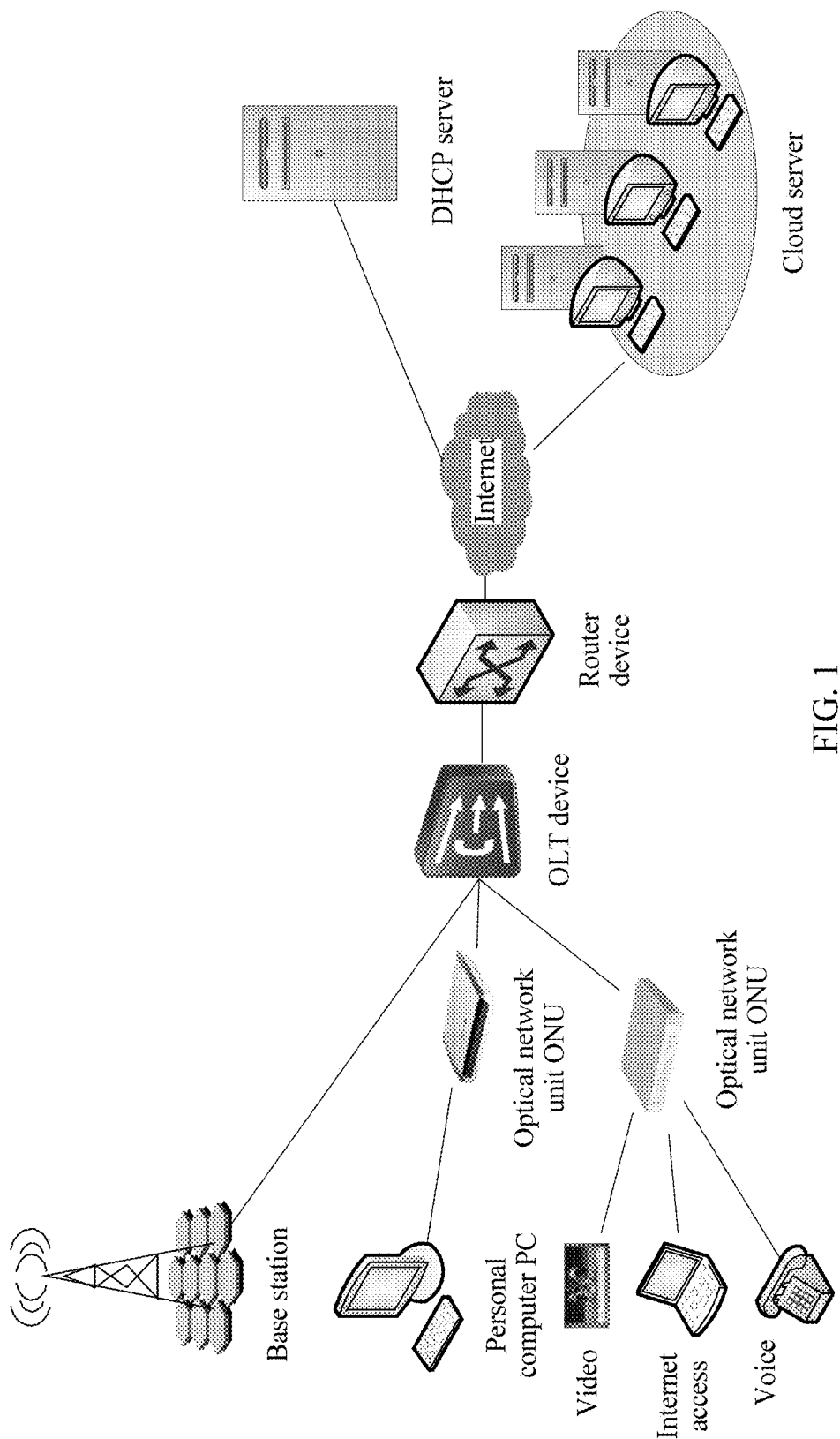
FIG. 1 is a schematic diagram of an optical communications system architecture according to an embodiment of this application.

The following describes the embodiments of this application with reference to the accompanying drawings in the embodiments of this application.

In the specification, claims, and accompanying drawings of this application, the terms "first", "second", "third", "fourth", and the like are intended to distinguish between different objects but do not indicate a particular order. In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

In the following, some terms in this application are described, so as to help a person skilled in the art have a better understanding.

(1) An optical network unit (ONU) is a user-side device in an optical network, is disposed on a user side, and is used with an OLT, to implement layer-2 and layer-3 functions of the Ethernet and provide a user with a voice service, a data service, and a multimedia service. Main functions implemented by the optical network unit are as follows: selectively receiving data sent by the OLT and responding to a management command sent by the OLT, and performing corresponding adjustment, buffering Ethernet data of the user, and sending the data to an uplink direction in a sending window allocated by the OLT, and other user management functions.

(2) A media access control (MAC) media access control sublayer protocol: The protocol is in a lower part of a data link layer in an open systems interconnection (OSI) protocol, and is mainly responsible for controlling and connecting physical media at a physical layer. When data is sent, the MAC protocol may determine in advance whether the data can be sent, and if the data can be sent, some control information is added to the data, and finally the data and the control information are sent to the physical layer in a specified format. Alternatively, when data is received, the MAC protocol first determines whether a transmission error occurs in input information, and if no error occurs, control information is removed, and the data is sent to an LLC layer.

(3) A virtual local area network (VLAN) is a communications technology in which a physical local area network LAN is logically divided into a plurality of broadcast domains. The VLAN is a group of logic devices and users, and these devices and users are not restricted by their physical locations, and may be organized based on a factor such as a function, a department, or an application. Communication between these devices and users seems like that these devices and users are in a same network segment. Therefore, the virtual local area network is named. The VLAN works at a layer 2 and a layer 3 of an OSI reference model. One VLAN is a broadcast domain. Communication between VLANs is completed by using a router at the layer 3. In a computer network, a 2-layer network may be divided into a plurality of different broadcast domains, and one broadcast domain corresponds to a specific user group. These different broadcast domains are mutually isolated by default. To perform communication between different broadcast domains, one or more routers are needed. Such a broadcast domain is referred to as a VLAN.

(4) A virtual system (VS): A communications device is logically divided into a plurality of systems, each logical system is a virtual system, and has a same function as the communications device, and resources are isolated. All virtual systems share hardware resources, but are independent of each other.

The following describes the embodiments of this application with reference to accompanying drawings.

To facilitate understanding of the embodiments of this application, the following first describes an optical communications system architecture on which the embodiments of this application are based. FIG. 1 is a schematic diagram of an optical communications system architecture according to an embodiment of this application. Referring to FIG. 1, the optical communications system architecture mainly includes a user side, a network side, and an OLT device connecting the user side and the network side. The OLT device connects a device on the user side and a routing device on the network side for aggregation and access, and a plurality of devices may access the user side, such as a personal computer PC, a base station, and an ONU. The network side includes the routing device and various servers that are accessed through the Internet, such as a dynamic host configuration protocol (DHCP) server or a cloud server.

Figure 2:
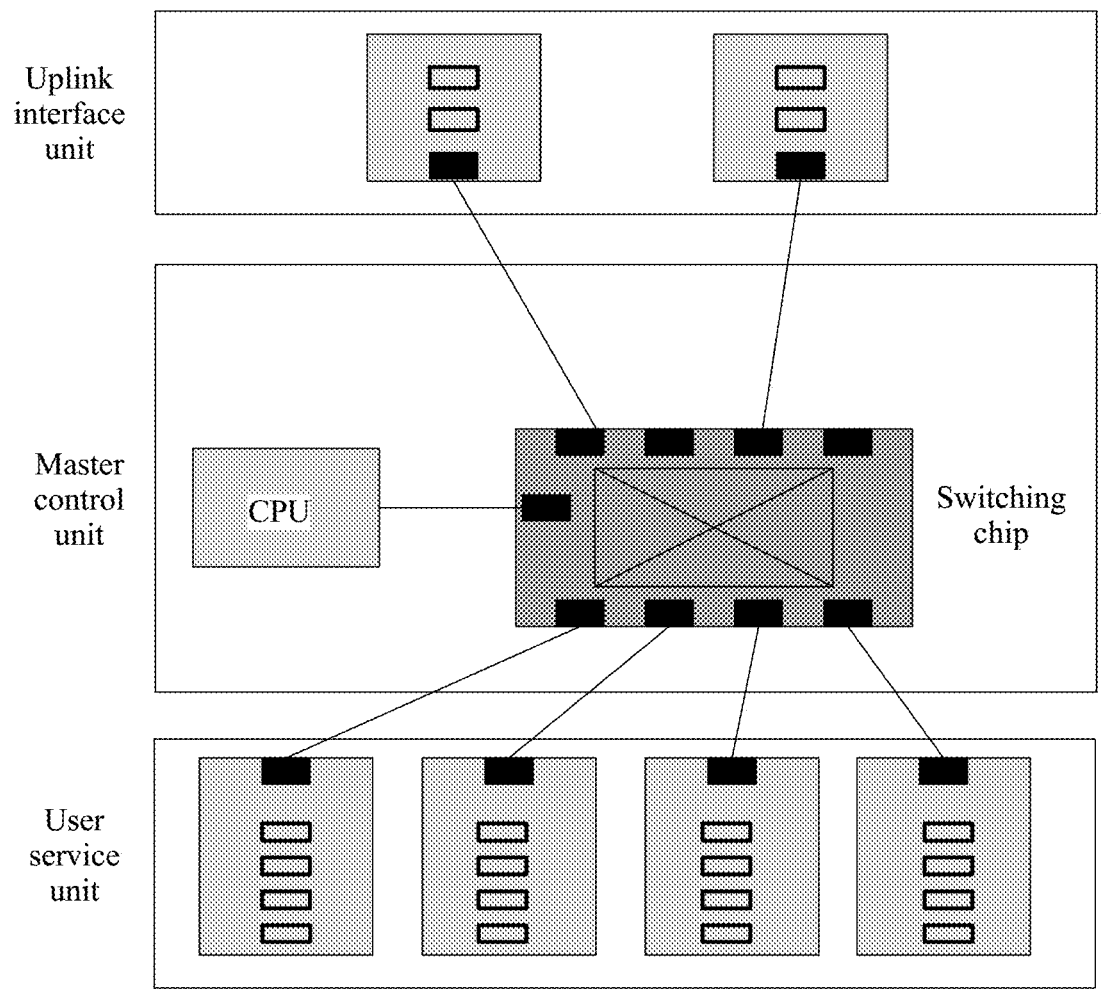
FIG. 2 is a schematic functional structural diagram of an OLT device according to an embodiment of this application.

In the OLT device, a network side interface and a user side interface are provided by using different types of boards. FIG. 2 is a schematic functional structural diagram of an OLT device according to an embodiment of this application. The OLT device may be divided into the following four functional units based on roles and functions of units on the user side and the network side in the OLT device.

A master control unit is a system control and management unit, implements configuration, management, and control of the entire OLT device, implements functions such as a simple routing protocol, and may be responsible for service processing, switching, and aggregation.

A user service unit is a unit that provides access to different types of user services, and implements user service access, processing, forwarding, and the like.

An uplink interface unit is a unit that is configured to provide a system uplink (sometimes the uplink interface unit may be configured for cascading) interface, to be specific, the uplink interface unit is used to provide network side access. The uplink interface unit is also configured to provide a system uplink interface or a cascading interface.

Other units are not shown in FIG. 2, including environment monitoring, a universal interface, and the like, and are configured to meet requirements of an operation and maintenance application scenario or a special service application scenario.

In the foregoing four major types, the first three types are cores of a communications device. On different devices, the three types of units (or the two types of units) may be concentrated on a same board, or may be completely distributed on different boards. For clearer description, the three types of units are directly abstracted as three independent units. This is not specifically limited in this application. It should be noted that an optical line terminal (OLT) device virtualization method provided in this application mainly corresponds to the foregoing master control unit, to be specific, a method embodiment in this application is mainly performed by the master control unit, and is implemented in cooperation with several other functional units.

Figure 3:
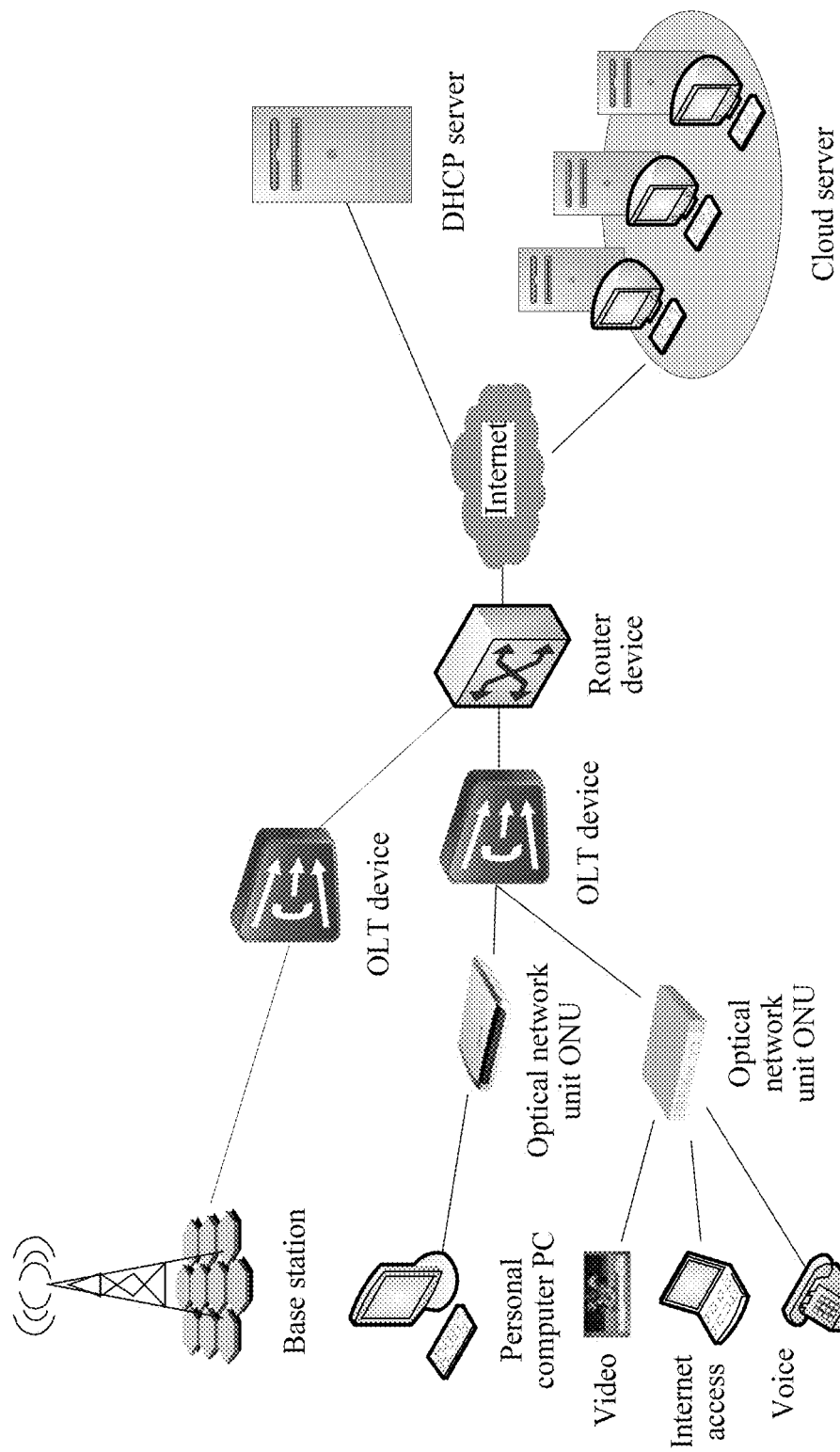
FIG. 3 is an architectural diagram of a solution of an OLT device according to an embodiment of this application.

First, a general idea of resolving a prior-art problem in this application needs to be analyzed. In the prior art, if the OLT device needs to meet requirements of different services, the OLT device may be redeployed in a solution. FIG. 3 is an architectural diagram of a solution of an OLT device according to an embodiment of this application. Different services (for example, base station services) are connected by adding a new OLT device, so that the requirements of the different services are met by using different OLT devices. However, a connection line between an OLT device and a customer is a physical connection line, and if the customer needs to be handed over from one operator to another operator, the connection line needs to be re-adjusted. Network flexibility is poor. In addition, construction factors need to be further considered. For example, networks of operators generally need to be implemented through a planning phase, an ordering phase, a construction phase, and the like, and a plurality of factors such as cabling, a warehouse volume, and power supply need to be considered in a construction process. Implementation difficulty is very high. Therefore, investment costs for redeploying the OLT device are high, a construction period is long, and a problem such as low resource usage or repeated construction of infrastructure is further caused.

Figure 4:
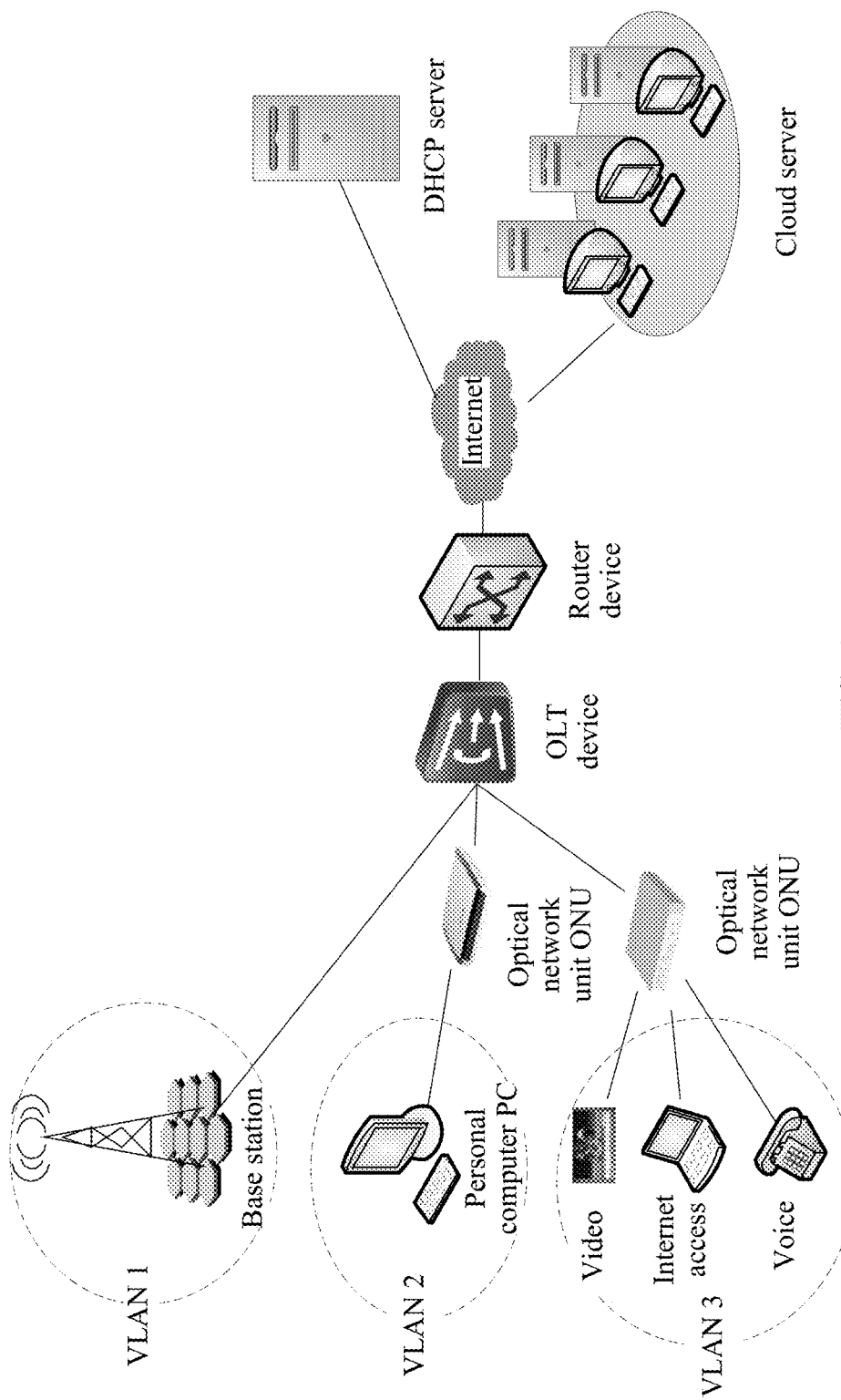
FIG. 4 is an architectural diagram of another solution of an OLT device according to an embodiment of this application.

In another solution, services of different users may be isolated by using a VLAN, so as to meet the requirements of the different services. FIG. 4 is an architectural diagram of another solution of an OLT device according to an embodiment of this application. Ethernet (ETH) packets of different services are configured as different VLAN fields, so that service data can be effectively isolated. For example, a base station service is configured as a VLAN 1, and a personal computer (PC) service is independently configured as a VLAN 2. However, configuration management interfaces in this solution are still a same interface. Therefore, a scenario in which a virtual operator leases a network cannot be supported very well, to be specific, only data isolation can be implemented, and resource isolation and configuration interface isolation cannot be implemented. However, if different operators need to use a same physical network, an OLT device operator needs to provide a service configuration service and a service provision service. Operation difficulty is high. In addition, if operator data needs to be backed up and migrated, configuration data of different operators cannot be well distinguished. In addition, OLT system resources cannot be completely isolated, and although service data of operators at different levels is well isolated, system resources are not well isolated. Therefore, once some users are attacked and consequently a system becomes abnormal, all users may be affected.

Based on the foregoing analysis and description, it may be determined that a technical problem that really needs to be resolved in this application is how to use a hardware layout condition of an existing OLT device to meet transmission requirements of a plurality of services. With reference to the embodiment of the optical line terminal (OLT) device virtualization method provided in this application, the following analyzes and resolves the foregoing technical problem raised in this application.

Figure 5:
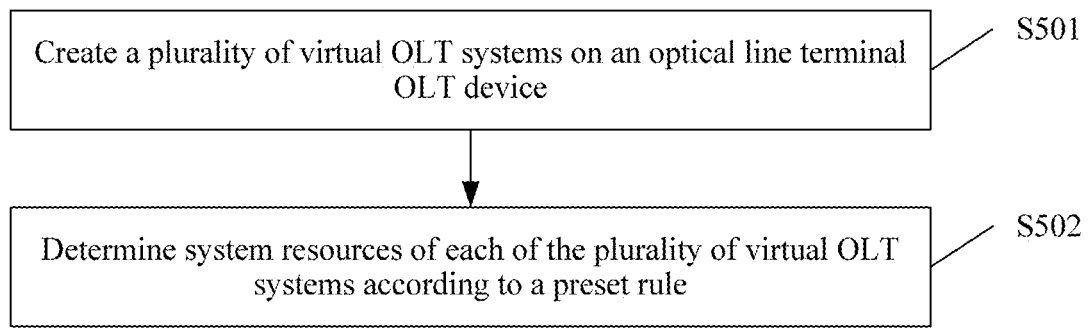
FIG. 5 is a schematic flowchart of an optical line terminal (OLT) device virtualization method according to an embodiment of this application.

FIG. 5 is a schematic flowchart of an optical line terminal (OLT) device virtualization method according to an embodiment of this application. The following describes, from a perspective of an OLT device side, the optical line terminal (OLT) device virtualization method in this embodiment of this application in detail with reference to FIG. 5. More specifically, this embodiment of this application may be performed by the foregoing master control unit in the OLT device. The method includes but is not limited to the following steps S501 and S502.

Step S501: Create a plurality of virtual OLT systems on an optical line terminal (OLT) device.

Specifically, the plurality of virtual OLT systems are created on one OLT device, in other words, a same physical OLT device is divided into the plurality of virtual OLT systems, so that data is separated when passing through the OLT.

In a possible implementation, the plurality of virtual OLT systems include one management OLT system and at least one common OLT system, where the common OLT system is configured to run and process an OLT service, and the management OLT system is configured to regulate the common OLT system and run and process the OLT service, or is configured to regulate the common OLT system. For example, the OLT device may be divided into two types of virtual machines a management virtual machine and a common virtual machine. There is only one management virtual machine, and the management virtual machine is allowed to allocate system resources. The common virtual machine only uses a resource and configures a service. A quantity of common virtual machines is variable, and the common virtual machine may be randomly created by the management virtual machine based on a service requirement.

Step S502: Determine system resources of each of the plurality of virtual OLT systems according to a preset rule.

Specifically, the system resources include a physical resource and a logical resource, and physical resources and logical resources of the plurality of virtual OLT systems are different from each other, in other words, physical resources and logical resources of different virtual OLT systems are completely isolated from each other. Resources of the plurality of virtual OLT systems are obtained by allocating total resources of the OLT device.

It may be understood that allocating resources to the plurality of created virtual OLT systems may be simultaneously allocating resources to the plurality of virtual OLT systems, or may be sequentially allocating resources to virtual OLT systems that are sequentially created. For example, the resources may be allocated, in advance in a centralized manner, to the OLT device at a time, or may be allocated based on a requirement, in other words, may be allocated when a resource is required. All the allocated resources are from all the physical resources and logical resources on the OLT device. The logical resources include an application process, a virtual machine (VM), a thread, network management, an alarm, a log, a configuration file, a media access control (MAC) address, an IP address, a service flow, a VLAN, a VLAN layer-3 interface, and the like. The physical resources may include a shelf, a slot, a port, an optical network terminal (ONT), a central processing unit (CPU), a memory, and the like.

A specific rule for allocating the system resources may include the following four manners.

Manner 1: The system resources are allocated based on a service board, to be specific, service boards that are on the OLT device and that are allocated to the plurality of virtual OLT systems are different. This manner is applicable to a scenario in which some devices are leased to a virtual operator, in other words, several service boards are allocated to each virtual operator, and all objects such as a port, an ONT, and a service flow under a service board belong to a corresponding common virtual OLT system.

Manner 2: The system resources are allocated based on a port, to be specific, ports that are on the OLT device and that are allocated to the plurality of virtual OLT systems are different. Different ports are allocated to different virtual OLT systems. This manner is applicable to a scenario in which users with different priority levels exist in a same area. For example, there are both an enterprise and a family user in a commercial complex, a network of the enterprise may be connected to a virtual OLT system 1, the family user may be connected to a virtual OLT system 2, and the two virtual OLT systems belong to one operator. In this scenario, ports on a same board are allowed to belong to different virtual OLT systems, and physical resources of the virtual OLT systems may be bound at a granularity of a port.

Manner 3: The system resources are allocated based on an ONU, to be specific, optical network units (ONUs) that are on the OLT device and that are allocated to the plurality of virtual OLT systems are different. In this manner, division in which different users under a PON interface belong to different virtual OLT systems may be implemented, and this manner is applicable to a scenario in which different levels of users exist in a same building, for example, there are both an enterprise and a family user in a commercial building. During cabling, for a scenario in which ONTs in a same area are allocated to a same port, this manner is more flexible than the foregoing two manners.

Manner 4: A service flow-based manner, to be specific, service flows corresponding to the plurality of virtual OLT systems are different. In this manner, a case in which different service flows in a same ONT belong to different virtual OLT systems may be implemented, and this manner is applicable to a case in which different operator services exist in a same family or enterprise, for example, a scenario in which a video service is provided by an operator, but a voice service is provided by another operator. Management may be performed by using a service flow-based virtual OLT system, thereby effectively reducing repeated investment and construction at an end access layer, and providing a more flexible option for a customer.

It can be learned from the foregoing descriptions of the four manners that binding between a physical object and any virtual OLT system can be actually provided in this application. From Manner 1 to Manner 4, allocation granularities are increasingly small, and isolation capabilities are increasingly weakened. The four manners may be flexibly selected based on a requirement of a scenario. According to an allocation solution of a virtual OLT based on the four different dimensions: the service board, the port, the ONU, and the service flow, a physical object can be flexibly allocated to a virtual OLT system.

It may be understood that after each virtual OLT system obtains allocated system resources, a complete virtual OLT is formed, in other words, a function of a complete OLT device is also obtained. This is equivalent to that a plurality of available OLT devices are obtained by dividing one OLT device. Therefore, a prior-art problem that a complete isolation solution cannot be provided for a configuration interface, service data, and system resource based on current hardware is resolved.

In this embodiment of this application, based on a deployed network, a function in which a physical device is virtualized as a plurality of logic devices is implemented without changing a network topology or a structure of a communications device. After a virtual function is used, a function provided by the virtual OLT device for the outside is the same as a previously provided function, application experience of a customer and service provisioning remain unchanged, and the following beneficial effects are further brought.

(1) After a device supplier constructs an OLT device, the OLT may be divided into several different virtual OLTs, to provide a lease service for a plurality of operators. An independent service provisioning interface and an independent system maintenance interface are provided for each virtual OLT device, and even differentiated service features and customized specifications may be provided, thereby achieving efficient use of a physical device, and effectively reducing infrastructure costs and operation costs of an operator.

(2) Virtualization network deployment may be performed based on different user types, so as to provide different levels of security control and bandwidth control for an enterprise user, a common user, and a lessee, and even may provide different service package solutions for different users. A user is handed over between operators, without performing a hardware installation operation, and mobile number portability is implemented by using a function of re-allocating virtual system resources, so as to effectively reduce network operation and maintenance costs.

(3) The device supplier may perform operation and maintenance on a device in a centralized manner, to quickly resolve a problem encountered in a device running process, and implement subdivision of an operation and maintenance function and a service provisioning function, thereby effectively reducing the operation and maintenance costs.

Figure 6:
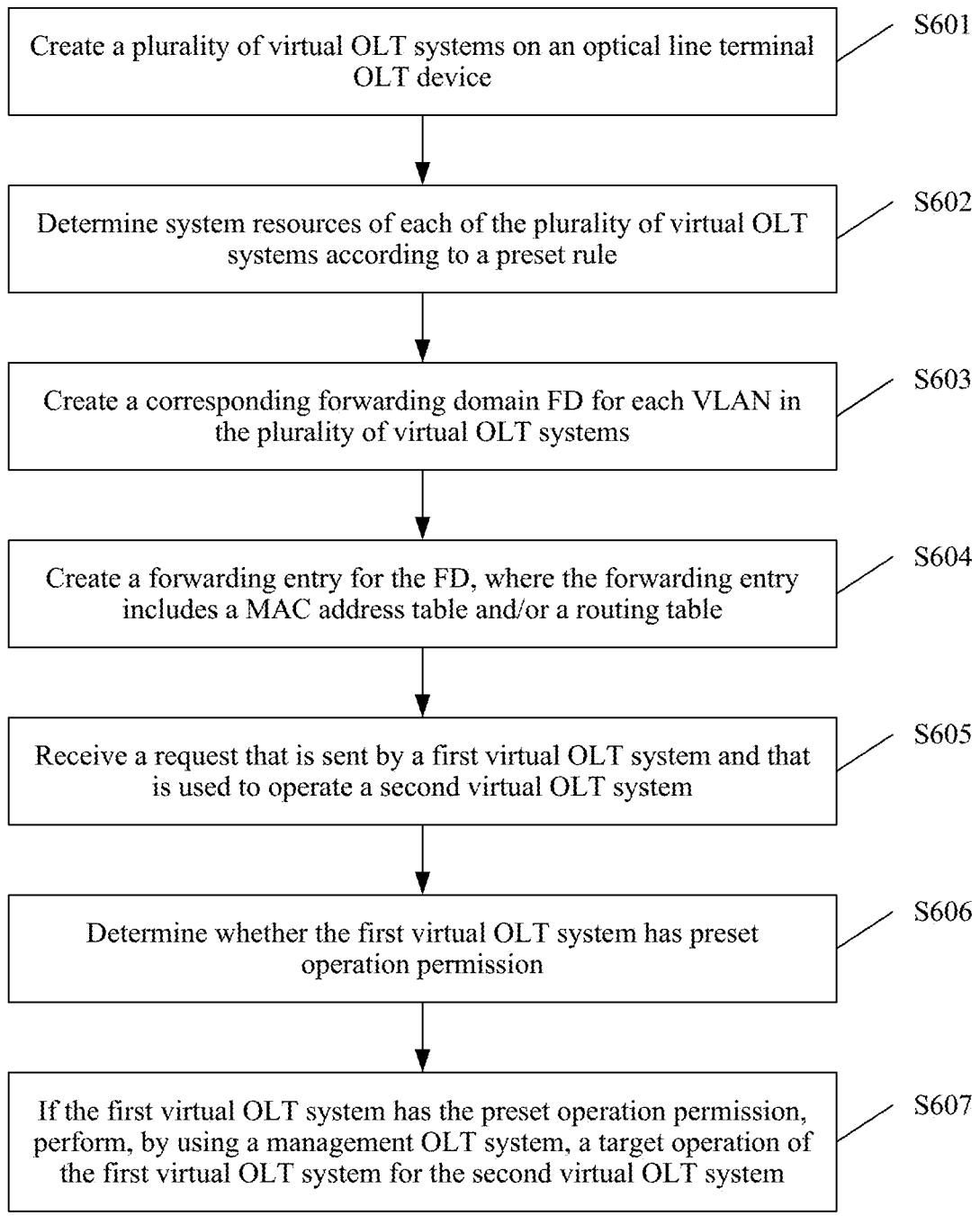
FIG. 6 is a schematic flowchart of another optical line terminal (OLT) device virtualization method according to an embodiment of this application.

FIG. 6 is a schematic flowchart of another optical line terminal (OLT) device virtualization method according to an embodiment of this application. The following describes, from a perspective of an OLT device side, the another optical line terminal (OLT) device virtualization method in this embodiment of this application in detail with reference to FIG. 6. More specifically, this embodiment of this application may be performed by the foregoing master control unit in the OLT device. The method includes but is not limited to the following steps S601 to S607.

Step S601: Create a plurality of virtual OLT systems on an optical line terminal (OLT) device.

Step S602: Determine system resources of each of the plurality of virtual OLT systems according to a preset rule, where the system resources include a physical resource and a logical resource, and physical resources and logical resources of the plurality of virtual OLT systems are different from each other.

Specifically, for step S601 and step S602, refer to step S501 and step S502 in the embodiment in FIG. 5.

Step S603: Create a corresponding forwarding domain (FD) for each VLAN in the plurality of virtual OLT systems.

Specifically, the virtual OLT system includes a plurality of virtual local area networks (VLANs), and any two VLANs in the plurality of OLT virtual systems correspond to different FDs. In the prior art, an entire OLT device corresponds to one forwarding domain, and packet forwarding is isolated based on an FD. Therefore, all data packets share all ports on the entire OLT device, and data cannot be isolated. In this application, the corresponding forwarding domain is created for each VLAN in all the virtual OLT systems, so that data between different virtual OLT systems is isolated. In addition, because FDs of different VLANs corresponding to a same virtual OLT system are different, data isolation is performed at a smaller granularity, so as to meet different requirements of different services.

In a possible implementation, the plurality of virtual OLT systems include a third virtual OLT system and a fourth virtual OLT system, and an intersection set between a VLAN ID set corresponding to the third virtual OLT system and a VLAN ID set corresponding to the fourth virtual OLT system is not an empty set, and the VLAN ID set includes VLAN IDs of all VLANs in a corresponding OLT system. In the prior art, because an OLT device corresponds to only one forwarding domain, VLAN IDs of VLANs corresponding to the entire OLT device are different. However, in this application, because a plurality of virtual OLT devices are created on a same OLT device, and the virtual OLT devices are isolated from each other, VLAN IDs of VLANs corresponding to different virtual OLT devices may be the same. In this way, VLAN resources between different virtual OLT devices can be repeatedly configured, and are not affected by each other.

Step S604: Create a forwarding entry for the FD, where the forwarding entry includes a MAC address table and/or a routing table.

Specifically, the FD specifically represents that the forwarding domain is in a forwarding range corresponding to the MAC address table and/or the routing table that are/is included in the forwarding entry corresponding to the FD.

Step S605: Receive a request that is sent by a first virtual OLT system and that is used to operate a second virtual OLT system, where the at least one common OLT system includes the first virtual OLT system and the second virtual OLT system.

Specifically, after the OLT device receives a request that is sent by one virtual OLT system and that is used to operate another virtual OLT system, such as the second virtual OLT system, it may be learned that the first virtual OLT system needs to perform a traversal operation on the second virtual OLT system. An application scenario may be that a fault occurs in the second virtual OLT system, and a proxy operation needs to be performed by using the first virtual OLT system.

Step S606: Determine whether the first virtual OLT system has preset operation permission.

Specifically, the OLT device first needs to perform identity verification on the first virtual OLT system that needs to perform the traversal operation, and determines whether the first virtual OLT system has operation permission, so as to avoid an attack from a hacker, and the like.

Step S607: If the first virtual OLT system has the preset operation permission, perform, by using a management OLT system, a target operation of the first virtual OLT system for the second virtual OLT system.

Specifically, in the OLT device, only the management OLT system is authorized to manage and control a common OLT, and therefore the management OLT needs to be used as an agent to perform an operation that needs to be performed on the second virtual OLT system by the first virtual OLT system. Through implementation of this step, independent management between users is ensured, and further, in some special cases such as global debugging, when a management user cooperates with a common user to perform problem locating, an existing common OLT may be used to manage another common OLT. Therefore, permission needs to be obtained from the management OLT in advance.

In an actual application scenario, traversal management is allowed in two cases. For example, a root user manages another common user (it is assumed that the common OLT is an OLT 1), or a common user that obtains permission manages another common user. The following uses an example to describe a process of managing the OLT 1 by using the root user.

1. Log in to a device by using the root user, and initiate an OLT 1 traversal request.

2. After being authenticated by the OLT 1, the root user has traversal permission, and the root user is allowed to manage the OLT 1.

3. A management OLT (which is assumed to be an OLT 0) is used as an agent to perform connection management on the OLT 1. All operations on the OLT 0 are directly transmitted to the OLT 1, and an operation log is recorded in the OLT 0 for subsequent locating.

4. After the operation ends, a traversal operation cancellation request is sent by using the root user, and the OLT 1 disconnects the connection agent.

The virtual OLT system is managed through the traversal operation, so that the management user can easily assist a virtual operator in service configuration or problem locating.

In this embodiment of this application, a beneficial effect of the embodiment corresponding to FIG. 5 is retained, and a complete data isolation solution and a complete resource isolation solution are further provided in different virtual OLT systems, so that an isolation effect obtained after a new hardware device is added is achieved without adding a hardware device, hardware sharing is implemented, and software is completely isolated. Further, when needed, problem locating assistance processing of the management user for the common user can be implemented through the traversal operation.

The following describes, by using an implementation of creating two different virtual OLTs in a system as an example in this application, a method and a principle for creating a virtual OLT and performing system management based on the virtual OLT in a specific application scenario. At an initial stage after the system starts, the OLT device has only one logical system. Then the OLT device may create a virtual OLT system, and the virtual OLT system is divided into two types of systems.

Management OLT: There is only one management OLT (which is referred to as an OLT 0 in the following). The OLT 0 may perform pre-configuration on another common OLT, allocate OLT resources, and the like. A user of the OLT 0 may globally observe statuses of all common OLTs. The OLT 0 is managed and maintained by an infrastructure operator. Resources of the management OLT may be allocated to another OLT. After allocation, resources belonging to the management OLT are correspondingly reduced.

Common OLT: A plurality of common OLTs may be configured, and are mainly responsible for configuration management of a service. Each common OLT may be independently configured with a service, and a user of each common OLT can only manage and query resources belonging to the common OLT, and may perform service configuration based on these resources. The common OLT is maintained by a level-2 operator.

A specific application scenario of the method for creating a virtual OLT and performing system management based on the virtual OLT in this application may include the following procedures.

(1) Before OLT virtualization configuration is performed, the OLT runs normally.

(2) Log in to a device by using a management OLT user, and then a new virtual system OLT 1 is added to the OLT 0. In a configuration process, the system automatically creates an OLT ID, and automatically allocates basic hardware resource space required for system running, including an independent alarm, a configuration data file, operation log storage space, and an independent service process. In addition, a new management user and an IP address used for management are added for the OLT 1.

(3) Hardware resources are allocated to the OLT 1 by using the management user, where allocated resource objects include a shelf, a board, a port, an ONU, a service flow, and the like, and a correspondence table between an OLT and a physical resource is established. Before allocation, whether hardware resources of the system are sufficient needs to be first checked. If the hardware resources are insufficient, that the OLT fails to be created is prompted. To flexibly support a service, physical resource objects may be bound in a plurality of manners, and may be divided based on a requirement of a scenario at different granularities. The foregoing resource objects may belong to any OLT based on a requirement. A specific allocation manner and a suitable scenario are as follows.

(4) A system specification is configured for the OLT 1 by using the user of the management OLT 0. To implement service forwarding, the system further has some specification entries, such as a quantity of system users and a quantity of supported IP addresses. These system specifications actually also correspond to physical resources of the system. Some specification entries are configured for the OLT 1 by using a command, and these specification entries include the following.

| Specification entry | Specification description |
| --- | --- |
| Quantity of system users | Specification of a total quantity of users that can be configured in a system |
| Quantity of bound IP addresses | Specification of a total quantity of IP addresses that are allowed to be configured in a virtual system |
| Quantity of bound MAC addresses | Specification of a total quantity of MAC addresses that are allowed to be configured in a virtual system |
| Quantity of dynamic MAC addresses | Specification of a total quantity of dynamic MAC addresses |
| Total quantity of flows | Specification of a total quantity of service flows |
| Quantity of IP traffic templates | Specification of a total quantity of traffic templates |
| Total quantity of port VLANs | Specification of a total quantity of port VLANs, or actually a correspondence table between a port and a VLAN |
| Total quantity of VLANs | Specification of a total quantity of VLANs, or a quantity of virtual local area networks supported by the system |
| Total quantity of VLANifs | Specification of a total quantity of VLANif interfaces, or a quantity of configured layer-3 interfaces when layer-3 forwarding is performed |

When no common OLT is configured, all specifications belong to the OLT 0. After some resources are configured for the OLT 1, the remaining specifications are correspondingly reduced while a total quantity of specifications of the system remains unchanged.

(5) Log in to the OLT 1 by using the management user of the common OLT 1 (the IP address has been created by the OLT 0 in a first step). In this case, the IP address of the OLT 1 may be modified, and a bridge MAC address of the system may be automatically allocated from a MAC address pool. In this case, the system has a new identity, and this address may be used for registration with a network management system. Then, a new OLT is observed from the network management system. A physical resource and a service configuration that can be observed belong to the OLT 1.

After the OLT 1 is registered, a new topology relationship is generated on the network management system without affecting management of an original OLT device. Functions such as an alarm, a log, and data of the OLT system are managed by and synchronized with the new OLT system, and therefore isolation is implemented on a management interface. After the user is added to a customer, the customer may independently configure and manage the OLT 1.

(6) Another user is created for the OLT 1 by using the management user of the OLT 1, to implement isolation of the management interface. Management between different common OLTs is separated by using a process. Each process has an independent database, log, alarm module, and debugging information maintenance module, so that user management is performed independently and does not affect each other.

(7) A service is configured by using the management user of the OLT 1. In a service configuration process, an independent forwarding domain FD (Forwarding Domain) is created, and forwarding domain information is delivered to a forwarding chip, so as to implement forwarding resource isolation between different OLTs.

Forwarding resources include an independent VLAN entry, an independent MAC entry, and an independent routing entry. Normalization of division of forwarding domains may be implemented by dividing the FDs in a centralized manner, and packet isolation may be implemented at a logical level.

To implement the forwarding domain isolation, the system needs to perform the following operations.

Step 1: A physical object is allocated to a new OLT when the new OLT is added. The system automatically binds a physical resource object and an OLT. For details, refer to the following table.

| OLT number | Object type | Physical resource object |
|---|---|---|
| OLT 1 | Board | Shelf 0 and slot 1 |
| OLT 1 | Port | Shelf 0, slot 2, and port 1 |
| OLT 1 | ONT | Shelf 0, slot 2, port 2, and ONT 10 |
| OLT 2 | Board | Shelf 0 and slot 5 |
| OLT 2 | Port | Shelf 0, slot 6, and port 1 |
| OLT 2 | ONT | Shelf 0, slot 6, port 2, and ONT 10 |

Step 2: In a VLAN configuration process, a separate FD is created based on the OLT and a VLAN ID, a VLAN and an FD are bound, and an independent forwarding entry is established for each FD. It should be noted that a number of the forwarding domain FD, a number of the VLAN ID, or the like is merely used as an example for description, and is used for a distinguishing purpose and is not used for limitation. For example, both a forwarding domain of a VLAN 100 and a forwarding domain of a VLAN 101 in the OLT 1 system are an FD 1. For a distinguishing purpose, the forwarding domain corresponding to the VLAN 100 is represented as an FD 11, and the forwarding domain corresponding to the VLAN 101 is represented as an FD 12.

Essentially, the FD 11 and the FD 12 belong to the same forwarding domain FD 1. Likewise, a case for a VLAN 100 and a VLAN 101 that are corresponding to an OLT 2 is similar to the foregoing case, and details are not described herein again. For details, refer to the following table.

| OLT | VLAN ID | Packet search forwarding domain |
|---|---|---|
| OLT 1 | VLAN 100 | FD 11 |
| OLT 1 | VLAN 101 | FD 12 |
| OLT 2 | VLAN 100 | FD 21 |
| OLT 2 | VLAN 101 | FD 22 |

It may be understood that because the relationship between a VLAN and an FD is established based on the OLT, VLANs between different OLTs can be repeatedly configured. For example, as shown in the foregoing table, a forwarding domain corresponding to the VLAN 100 in the OLT 1 is the FD 11, and a forwarding domain corresponding to the VLAN 100 in the OLT 2 is the FD 21. Through management of the correspondence, complete isolation of forwarding domains between different OLTs can be implemented, and users belonging to different OLTs may be configured with a same VLAN ID, and service configuration does not affect each other.

Step 3: In a service flow configuration process, a VLAN to which a service flow belongs is specified. Therefore, any service flow may have a unique VLAN ID, and an ingress port of a packet may be learned by using a chip in a packet uplink process. An FD can be uniquely determined by using the two pieces of information.

Figure 7:
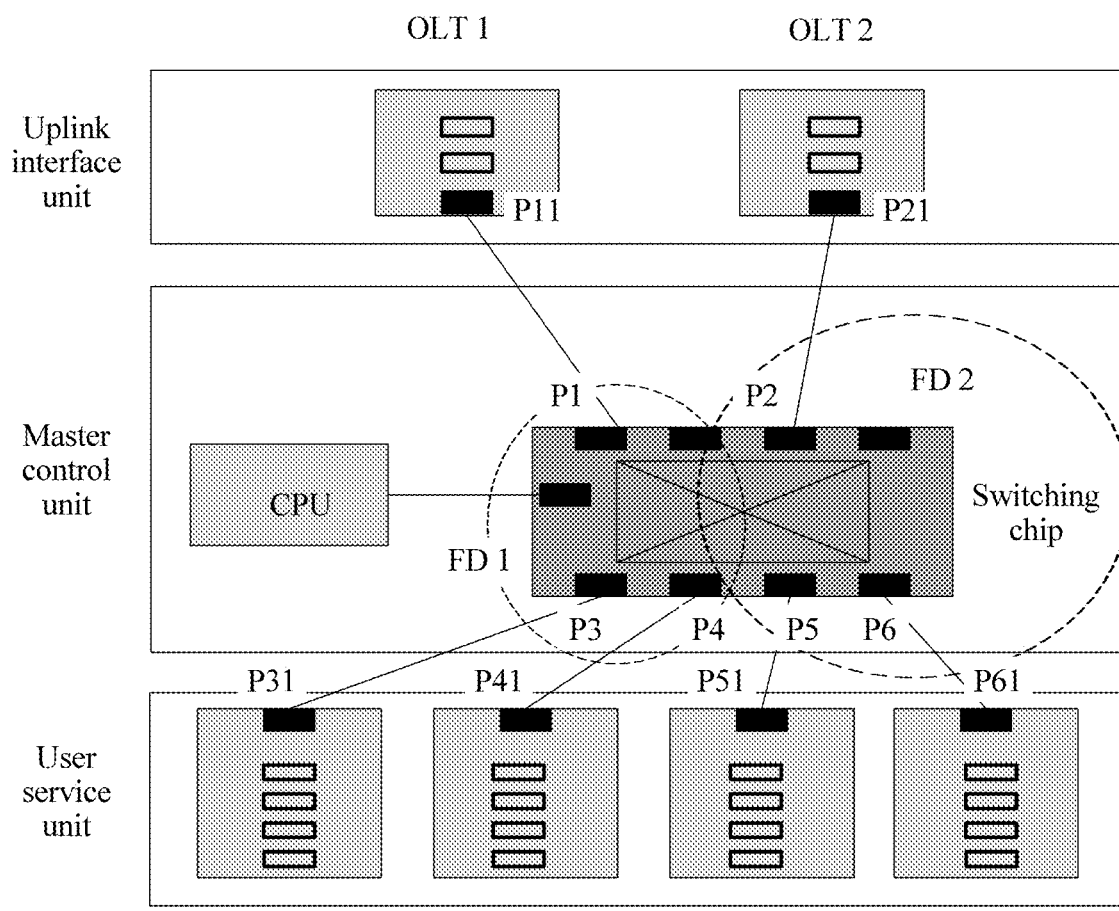
FIG. 7 is a schematic diagram of packet forwarding of an optical line terminal (OLT) device according to an embodiment of this application.

The system may search, based on the VLAN and the MAC, a forwarding table corresponding to the FD, for an egress port of the packet. If the egress port cannot be found, the system performs broadcasting in the FD. FIG. 7 is a schematic diagram of packet forwarding according to an embodiment of this application. An OLT 1 corresponds to a forwarding domain FD 1, and the FD 1 corresponds to ports P1, P3, and P4. An OLT 2 corresponds to an FD 2, and the FD 2 corresponds to P2, P5, and P6. Matched ports of an uplink interface unit are P11 and P21. Ingress ports of a user service unit are P31, P41, P51, and P61. It is assumed that a forwarding port of packet data Msg 11 is P1 in the FD 1, the OLT 1 forwards the Msg1 to the port P1 in the FD 1. It is assumed that a forwarding port of Msg 12 is unclear, in other words, port matching fails, the Msg 12 is broadcast in the corresponding FD 1, in other words, the Msg 12 is broadcast in the ports P1, P3, and P4. A case for the OLT 2 is similar to the foregoing case for the OLT 1, and details are not described herein again. For details, refer to the following table.

| Packet | VLAN ID | Ingress port | Destination MAC | OLT number | Forwarding domain | Matched port | Processing manner |
|---|---|---|---|---|---|---|---|
| Msg 11 | 100 | P31 | MAC 1 | OLT 1 | FD 11 | P11 | The packet is forwarded to P1. |
| Msg 12 | 101 | P41 | MAC 2 | OLT 1 | FD 12 | Matching fails. | The packet is broadcast |

-continued

| Packet | VLAN ID | Ingress port | Destination MAC | OLT number | Forwarding domain | Matched port | Processing manner |
|---|---|---|---|---|---|---|---|
| Msg 21 | 100 | P51 | MAC 3 | OLT 2 | FD 21 | P21 | in a port P1/P3/P4. The packet is forwarded to P2. |
| Msg 22 | 101 | P61 | MAC 4 | OLT 2 | FD 22 | Matching fails. | The packet is broadcast in a port P2/P5/P6. |

It can be learned from the foregoing table that there is no intersection set between a packet of the OLT 1 and a packet of the OLT 2 regardless of forwarding or broadcasting. Therefore, complete isolation is implemented, but a packet behavior is consistent with that in independent OLT forwarding. A table lookup processing manner of a downlink packet is the same as that of an uplink packet.

(8) In a service configuration process, based on an OLT to which a user belongs, different databases and configuration files may be generated, and when the user performs backup and storage operations, only a configuration of the OLT to which the user belongs is operated. When a system is restarted, only a process and an entry that are related to the OLT to which the user belongs are restarted, so as to implement isolation at a management and maintenance layer.

(9) An O&M engineer can only see, by using a common OLT user, debugging information of an OLT to which the common OLT user belongs, but can see debugging information of all OLTs by using the user of the OLT 0. In this way, a customer of a virtual system may locate a service problem, and a device operator can maintain all hardware and devices in a centralized manner, thereby improving overall maintenance efficiency.

In the foregoing specific embodiments provided in this application, an area is divided based on three layers: management, control, and forwarding, so as to ensure that a system forms a complete management and service processing capability in different virtual systems, and different virtual systems do not affect each other and have a good isolation capability.

The foregoing has described the method in the embodiments of this application in detail. The following provides a related device in the embodiments of this application.

Figure 8:
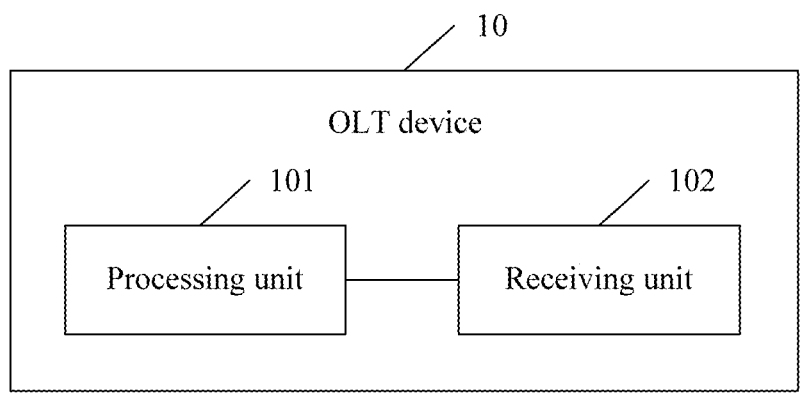
FIG. 8 is a schematic structural diagram of an optical line terminal (OLT) device according to an embodiment of this application.

FIG. 8 is a schematic structural diagram of an optical line terminal (OLT) device according to an embodiment of this application. The optical line terminal (OLT) device may include a processing unit 101. Each unit is described in detail below.

The processing unit 101 is configured to create a plurality of virtual OLT systems on the optical line terminal (OLT) device.

The processing unit 101 is further configured to determine system resources of each of the plurality of virtual OLT systems according to a preset rule, where the system resources include a physical resource and a logical resource, and physical resources and logical resources of the plurality of virtual OLT systems are different from each other.

Specifically, the preset rule includes service boards that are on the OLT device and that are allocated to the plurality of virtual OLT systems are different, ports that are on the OLT device and that are allocated to the plurality of virtual OLT systems are different, optical network units ONUs that are on the OLT device and that are allocated to the plurality of virtual OLT systems are different, or service flows corresponding to the plurality of virtual OLT systems are different.

Further, the plurality of virtual OLT systems include one management OLT system and at least one common OLT system, where the common OLT system is configured to run and process an OLT service, and the management OLT system is configured to regulate the common OLT system and run and process the OLT service, or is configured to regulate the common OLT system.

Further, the device includes a receiving unit 102. The at least one common OLT system includes a first virtual OLT system and a second virtual OLT system. The processing unit 101 is further configured to receive, by using the receiving unit 102, a request that is sent by the first virtual OLT system and that is used to operate the second virtual OLT system, determine whether the first virtual OLT system has preset operation permission, and if the first virtual OLT system has the preset operation permission, perform, by using the management OLT system, a target operation of the first virtual OLT system for the second virtual OLT system.

Further, the virtual OLT system includes a plurality of virtual local area networks VLANs, and the processing unit 101 is further configured to create a corresponding forwarding domain FD for each VLAN in the plurality of virtual OLT systems, where any two VLANs in the plurality of OLT virtual systems correspond to different FDs.

Further, the plurality of virtual OLT systems include a third virtual OLT system and a fourth virtual OLT system. An intersection set between a VLAN ID set corresponding to the third virtual OLT system and a VLAN ID set corresponding to the fourth virtual OLT system is not an empty set, and the VLAN ID set includes VLAN IDs of all VLANs in a corresponding OLT system.

Further, the processing unit 101 is configured to create a forwarding entry for the FD, where the forwarding entry includes a MAC address table and/or a routing table.

Further, the logical resource includes at least one of an application process, a virtual machine VM, a thread, network management, an alarm, a log, a configuration file, a media access control MAC address, an IP address, a service flow, a VLAN, and a VLAN layer-3 interface.

Further, the physical resource includes at least one of a shelf, a slot, a port, an optical network terminal ONT, a central processing unit CPU, and a memory.

It should be noted that, for functions of the functional modules in the optical line terminal (OLT) device 10 described in this embodiment of this application, reference may be made to related descriptions of the corresponding OLT device in the embodiments shown in FIG. 1 to FIG. 7. Details are not described herein again.

Figure 9:
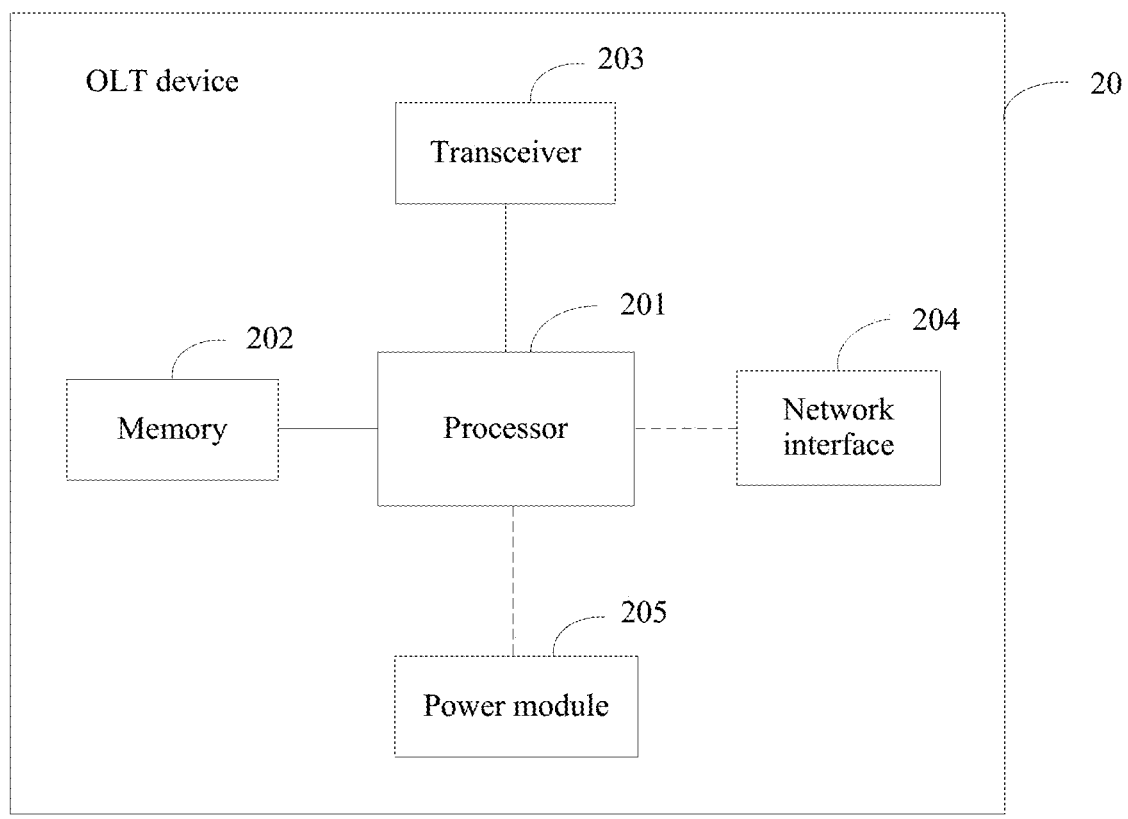
FIG. 9 is a schematic structural diagram of another optical line terminal (OLT) device according to an embodiment of this application.

FIG. 9 is a schematic structural diagram of another optical line terminal (OLT) device according to an embodiment of this application. The optical line terminal (OLT) device 20 includes a processor 201, a memory 202, and a transceiver 203. The processor 201, the memory 202, and the transceiver 203 may be connected by using a bus or in another manner.

Optionally, the optical line terminal (OLT) device 20 may further include a network interface 204 and a power module 205.

The processor 201 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor 201 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory 202 is configured to store an instruction. During specific implementation, the memory 202 may be a read-only memory (ROM for short) or a random access memory (RAM for short). In this embodiment of this application, the memory 202 is configured to store session connection establishment program code.

The transceiver 203 is configured to receive and send a signal, and is configured to communicate with another network device, for example, receive or send data from or to another base station, a security gateway, or the like.

The network interface 204 is configured for the network device 20 to perform data communication with another device. The network interface 204 may be a wired interface or a wireless interface, and perform communication connection between the local network device and another network device, for example, a terminal device, a base station, a server, or a security gateway, over a wired or wireless network.

The power module 205 is configured to supply power to each module in the network device 20.

The processor 201 is configured to invoke the instruction stored in the memory 202, to perform the following operations, including creating a plurality of virtual OLT systems on the optical line terminal (OLT) device, and determining system resources of each of the plurality of virtual OLT systems according to a preset rule, where the system resources include a physical resource and a logical resource, and physical resources and logical resources of the plurality of virtual OLT systems are different from each other.

Specifically, the preset rule includes service boards that are on the OLT device and that are allocated to the plurality of virtual OLT systems are different, ports that are on the OLT device and that are allocated to the plurality of virtual OLT systems are different, optical network units ONUs that are on the OLT device and that are allocated to the plurality of virtual OLT systems are different, or service flows corresponding to the plurality of virtual OLT systems are different.

Further, the plurality of virtual OLT systems include one management OLT system and at least one common OLT system, where the common OLT system is configured to run and process an OLT service, and the management OLT system is configured to regulate the common OLT system and run and process the OLT service, or is configured to regulate the common OLT system.

Further, the at least one common OLT system includes a first virtual OLT system and a second virtual OLT system. The processor 201 is further configured to receive, by using the transceiver 203, a request that is sent by the first virtual OLT system and that is used to operate the second virtual OLT system, determine whether the first virtual OLT system has preset operation permission, and if the first virtual OLT system has the preset operation permission, perform, by using the management OLT system, a target operation of the first virtual OLT system for the second virtual OLT system.

Further, the virtual OLT system includes a plurality of virtual local area networks VLANs. The processor 201 is further configured to create a corresponding forwarding domain FD for each VLAN in the plurality of virtual OLT systems, where any two VLANs in the plurality of OLT virtual systems correspond to different FDs.

Further, the plurality of virtual OLT systems include a third virtual OLT system and a fourth virtual OLT system.

An intersection set between a VLAN ID set corresponding to the third virtual OLT system and a VLAN ID set corresponding to the fourth virtual OLT system is not an empty set, and the VLAN ID set includes VLAN IDs of all VLANs in a corresponding OLT system.

Further, the processor 201 is configured to create a forwarding entry for the FD, where the forwarding entry includes a MAC address table and/or a routing table.

Further, the logical resource includes at least one of an application process, a virtual machine VM, a thread, network management, an alarm, a log, a configuration file, a media access control MAC address, an IP address, a service flow, a VLAN, and a VLAN layer-3 interface.

Further, the physical resource includes at least one of a shelf, a slot, a port, an optical network terminal ONT, a central processing unit CPU, and a memory.

It should be noted that, for functions of the functional modules in the optical line terminal (OLT) device 20 described in this embodiment of this application, reference may be made to related descriptions of the corresponding OLT device in the embodiments shown in FIG. 1 to FIG. 7. Details are not described herein again.

An embodiment of this application further provides a computer storage medium. The computer storage medium may store a program. When the program is executed, some or all of the steps of any optical line terminal (OLT) device virtualization method in the foregoing method embodiments are performed.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another distribution form, such as by using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Therefore, although this application is described with reference to specific features and the embodiments thereof, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An optical line terminal (OLT) device virtualization method, comprising:

creating a plurality of virtual OLT systems on an optical line terminal (OLT) device; and determining system resources of each virtual OLT of the plurality of virtual OLT systems according to a preset rule, wherein the system resources comprise a physical resource and a logical resource, wherein physical resources of the plurality of virtual OLT systems are different from logical resources of the plurality of virtual OLT systems, wherein the preset rule controls allocation of physical resources for a virtual OLT of the plurality of virtual OLT systems according to port information of the OLT device, wherein physical resources include a shelf, a slot, an optical network terminal (ONT), a central processing unit (CPU), and a memory, and wherein more than one virtual OLT system may be assigned to one or more ports on a same service board.

2. The method according to claim 1, wherein, the determining the system resources of each virtual OLT according to the preset rule results in at least one of:

service boards that are on the OLT device and that are allocated to the plurality of virtual OLT systems are different;

ports that are on the OLT device and that are allocated to the plurality of virtual OLT systems are different;

optical network units (ONUs) that are on the OLT device and that are allocated to the plurality of virtual OLT systems are different; or service flows corresponding to the plurality of virtual OLT systems are different.

3. The method according to claim 2, wherein the plurality of virtual OLT systems comprise one management OLT system and at least one common OLT system, wherein the common OLT system is configured to run and process an OLT service, and wherein the management OLT system is configured to regulate the common OLT system and run and process the OLT service, or is configured to regulate the common OLT system.

4. The method according to claim 3, wherein the at least one common OLT system comprises a first virtual OLT system and a second virtual OLT system, and wherein the method further comprises:

receiving a request that is sent by the first virtual OLT system and that is used to operate the second virtual OLT system;

determining whether the first virtual OLT system has preset operation permission; and performing, using the management OLT system, a target operation of the first virtual OLT system for the second virtual OLT system in response to the first virtual OLT system having the preset operation permission.

5. The method according to claim 4, wherein the virtual OLT system comprises a plurality of virtual local area networks (VLANs), and wherein the method further comprises:

creating a corresponding forwarding domain (FD) for each VLAN in the plurality of virtual OLT systems, wherein any two VLANs in the plurality of OLT virtual systems correspond to different FDs.

6. The method according to claim 5, wherein the plurality of virtual OLT systems comprise a third virtual OLT system and a fourth virtual OLT system; and wherein an intersection set between a VLAN ID set corresponding to the third virtual OLT system and a VLAN ID set corresponding to the fourth virtual OLT system is not an empty set, and wherein a VLAN ID set comprises VLAN IDs of all VLANs in a corresponding OLT system.

7. The method according to claim 6, wherein the method further comprises:
creating a forwarding entry for the FD, wherein the forwarding entry comprises at least one of a media access control (MAC) address table or a routing table.

8. The method according to claim 7, wherein the logical resource comprises at least one of an application process, a virtual machine (VM), a thread, network management, an alarm, a log, a configuration file, a media access control MAC address, an IP address, a service flow, a VLAN, or a VLAN layer-3 interface.

9. An optical line terminal (OLT) device, comprising:
a processor; and
a non-transitory computer-readable storage medium storing a program to be executed by the processor, the program including instructions to:
create a plurality of virtual OLT systems on the optical line terminal (OLT) device; and
determine system resources of each virtual OLT of the plurality of virtual OLT systems according to a preset rule, wherein the system resources comprise a physical resource and a logical resource, wherein physical resources of the plurality of virtual OLT systems are different from logical resources of the plurality of virtual OLT systems, wherein the preset rule controls allocation of physical resources for a virtual OLT of the plurality of virtual OLT systems according to port information of the OLT device, wherein physical resources include a shelf, a slot, an optical network terminal (ONT), a central processing unit (CPU), and a memory, and wherein more than one virtual OLT system may be assigned to one or more ports on a same service board.

10. The device according to claim 9, wherein the instructions to determine the system resources of each virtual OLT according to the preset rule results in at least one of:
service boards that are on the OLT device and that are allocated to the plurality of virtual OLT systems are different;
ports that are on the OLT device and that are allocated to the plurality of virtual OLT systems are different;
optical network units (ONUs) that are on the OLT device and that are allocated to the plurality of virtual OLT systems are different; or
service flows corresponding to the plurality of virtual OLT systems are different.

11. The device according to claim 10, wherein the plurality of virtual OLT systems comprise one management OLT system and at least one common OLT system, wherein the common OLT system is configured to run and process an OLT service, and wherein the management OLT system is configured to regulate the common OLT system and run and process the OLT service, or is configured to regulate the common OLT system.

12. The device according to claim 11, further comprising a receiver;
wherein the at least one common OLT system comprises a first virtual OLT system and a second virtual OLT system; and
wherein the program further includes instructions to:
receive, through the receiver, a request that is sent by the first virtual OLT system and that is used to operate the second virtual OLT system;
determine whether the first virtual OLT system has preset operation permission; and
perform, using the management OLT system, a target operation of the first virtual OLT system for the second virtual OLT system in response to the first virtual OLT system having the preset operation permission.

13. The device according to claim 12, wherein the virtual OLT system comprises a plurality of virtual local area networks (VLANs); and
wherein the program further includes instructions to:
create a corresponding forwarding domain (FD) for each VLAN of the plurality of VLANs in the plurality of virtual OLT systems, wherein any two VLANs in the plurality of OLT virtual systems correspond to different FDs.

14. The device according to claim 13, wherein the plurality of virtual OLT systems comprise a third virtual OLT system and a fourth virtual OLT system; and
wherein an intersection set between a VLAN identifier (ID) set corresponding to the third virtual OLT system and a VLAN ID set corresponding to the fourth virtual OLT system is not an empty set, and wherein a VLAN ID set comprises VLAN IDs of all VLANs in a corresponding OLT system.

15. The device according to claim 14, wherein the program further includes instructions to:
create a forwarding entry for the FD, wherein the forwarding entry comprises at least one of a media access control (MAC) address table or a routing table.

16. The device according to claim 15, wherein the logical resource comprises at least one of an application process, a virtual machine (VM), a thread, network management, an alarm, a log, a configuration file, a MAC address, an internet protocol (IP) address, a service flow, a VLAN, and a VLAN layer-3 interface.

17. A device, comprising:
a processor; and
a non-transitory computer-readable storage medium storing a program to be executed by the processor, the program including instructions to:
create a plurality of virtual optical line terminal (OLT) systems on an OLT device; and
determine system resources of each of the plurality of virtual OLT systems according to a preset rule, wherein the system resources comprise a physical resource and a logical resource, wherein physical resources and logical resources of the plurality of virtual OLT systems are different from each other, wherein the preset rule controls allocation of physical resources for a virtual OLT of the plurality of virtual OLT systems according to port information of the OLT device, wherein physical resources include a shelf, a slot, an optical network terminal (ONT), a central processing unit (CPU), and a memory, and wherein more than one virtual OLT system may be assigned to one or more ports on a same service board.

18. The device according to claim 17, further comprising a receiver;
wherein the plurality of virtual OLT systems comprise one management OLT system and at least one common OLT system, wherein the common OLT system is configured to run and process an OLT service, and wherein the management OLT system is configured to regulate the common OLT system;

wherein the at least one common OLT system comprises a first virtual OLT system and a second virtual OLT system; and wherein the program further includes instructions to:
receive, using the receiver, a request that is sent by the first virtual OLT system and that is used to operate the second virtual OLT system;
determine whether the first virtual OLT system has preset operation permission; and
perform, using the management OLT system, a target operation of the first virtual OLT system for the second virtual OLT system in response to the first virtual OLT system having the preset operation permission.

* * * * *